May 6, 1924.

F. W. KIDDER

DRAIN VALVE

Filed Nov. 12, 1921

1,492,883

Frank W. Kidder
INVENTOR.

BY

ATTORNEY.

Patented May 6, 1924.

1,492,883

UNITED STATES PATENT OFFICE.

FRANK W. KIDDER, OF NORTON, KANSAS.

DRAIN VALVE.

Application filed November 12, 1921. Serial No. 514,612.

*To all whom it may concern:*

Be it known that I, FRANK W. KIDDER, a citizen of the United States, residing at Norton, county of Norton, State of Kansas, have invented a certain new and useful Improvement in Drain Valves, and declare the following to be a full, clear, and exact description of the same, such as will enable others skilled in the art to which it pertains to make and use the same, reference being had to the accompanying drawings, which form a part of this specification.

This invention relates to drain valves and the principal object of the invention is to provide a drain valve which, when opened, may be very easily cleaned. A further object of the invention is to provide a drain valve which is held in tight engagement with its seat and is yieldably held in the open or closed position when so turned. A novel feature of the invention is involved in the angular position of the drain passage which opens entirely through the valve in a straight line thereby allowing the easy insertion of a wire therethrough to displace foreign matter which might enter and clog the valve and prevent the same from draining. These objects and the several novel features of the invention are hereinafter more fully described and claimed and the preferred form of construction by which these objects are attained is shown in the accompanying drawings in which—

Figure 1:
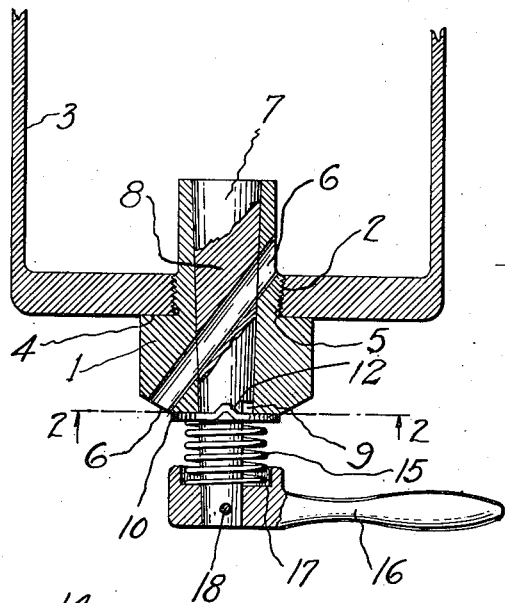
Fig. 1 is a section through a valve embodying my invention.
Figure 2:
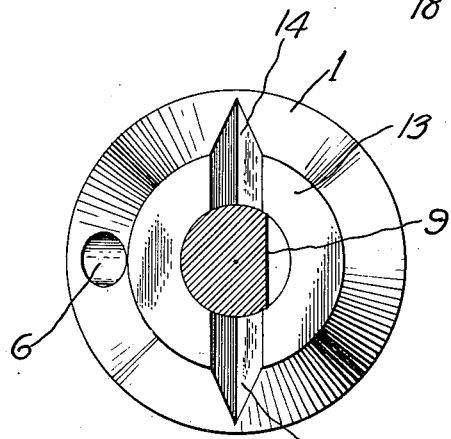
Fig. 2 is a section taken on line 2—2 of Fig. 1.
Figure 4:
Fig. 4 is a section taken on line 4—4 of Fig. 3.
Figure 3:
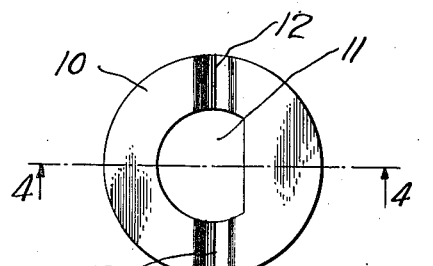
Fig. 3 is a plan view of the washer used on the valve stem somewhat enlarged.

The valve consists of an outer member 1 which is threaded at 2 into a tank or receptacle 3. This valve is provided with a shoulder 4 engaging the under surface of the tank or receptacle and a packing 5 is provided to prevent leakage between the valve and adjacent portion of the tank or receptacle. The member 1 of the valve is provided with a pair of apertures 6 which are drilled therethrough on an angle as shown in Fig. 1. The central or rotatable part 7 of the valve is provided with an angularly extending aperture 8 therethrough which when the valve is in the open position shown in Fig. 1 registers with the apertures 6 and allows passage of liquid therethrough. This valve portion 7 is tapered from one end to the other and is provided with a cut-away portion 9 at the lower end shown more particularly in Figs. 1 and 2. On this lower end 9 of the valve portion 7 is a washer 10 shown more particularly in Figs. 3 and 4. This washer 10 is provided with an aperture 11 therein fitting the portion 9 of the valve and the washer is provided with a pair of upwardly stamped pointed portions 12 as shown in Figs. 3 and 4. The lower flat face 13 of the member 1, as shown in Fig. 2, is provided with a pair of V shaped grooves 14 therein adapted to receive the raised portions 12 of the washer 10 when the valve is open. Beneath the washer 10 and about the portion 9 of the valve is a coiled spring 15 and secured to the lower end of the portion 9 is a handle 16 which is provided with a recess 17 adjacent the portion 9 to receive the lower end of the said spring 15. This handle is secured to the lower end of the portion 9 by a pin 18 and by this arrangement the valve portion 7, which is tapered, is held tightly in contact with the seat therefor in the member 1 by the spring 15 thereby preventing leakage between the valve parts.

In operation when the valve is open as shown in Fig. 1, the aperture 8 in the part 7 is in alignment with the apertures 6 in the part 1, thereby allowing liquid to flow from the tank 3 and be drained from the lower aperture 6. By this construction the apertures 6 and 8 provide a direct opening through the valve into the tank or receptacle 3 and should the said apertures 6 or 8 become clogged by foreign substance or the like a wire or other similar articles may be passed upwardly through the apertures 6 and 8 thereby clearing the channel and allowing the valve to drain. To close the valve it is necessary to turn the handle 16 one-half of a turn which forces the washer 10 downwardly out of the grooves 14 against action of the spring 15 and the washer is turned while held in this position until the valve closes at which time the points 12 of the washer again engage in the grooves 14 therefor, shown in Fig. 2. As the valve part 7 is turned from the position shown in Fig. 1 the aperture 8 therein is brought out of registration with the apertures 6 so that the valve is closed and the liquid is prevented from draining from the tank 13.

It will be noted that the upper aperture 6 opens into the receptacle 3 with a portion thereof extending flush with the bottom of the receptacle so that when the valve is open the entire amount of liquid is drained from the receptacle whereby no liquid is left in the receptacle to freeze, cause rust or otherwise clog the valve.

From the foregoing description it becomes evident that the device is very simple and efficient in operation, is easily cleaned, is of comparatively low manufacturing cost, and provides a device which accomplishes the objects desired.

Having thus fully described my invention, its utility and mode of operation, what I claim and desire to secure by Letters Patent of the United States is—

1. In a drain valve, an outer stationary valve part, an inner rotatable valve part provided with a channel therethrough at an angle to the longitudinal axis thereof, the outer valve part being provided with a pair of apertures extending thereinto at an angle on opposite sides of said rotatable valve part and the said apertures registering in alignment with the channel of the inner valve part when the valve is open, means for opening and closing the valve, and yieldable means for holding the valve in the open or closed position.

2. In a drain valve, an outer valve part, an inner rotatable valve part provided with a channel extending therethrough at an angle to the longitudinal axis thereof, the outer valve part being provided with a pair of apertures extending through the wall thereof at an angle on opposite sides of the inner rotatable valve part adapted to register with the channel of the inner valve part when the valve is open and provide a channel extending angularly through the valve from one side to the other.

3. In a drain valve for a receptacle, an outer valve part adapted to be secured in the bottom of the receptacle, an inner rotatable valve part provided with a channel extending therethrough at an angle to the longitudinal axis thereof, the outer valve part being provided with a pair of apertures on opposite sides of the rotatable valve part registering in alignment with the channel of the inner valve part when the valve is open, one of the apertures in the outer valve part adapted to lie flush with the bottom of the receptacle.

4. In a drain valve for a receptacle, an outer valve part adapted to be secured in the bottom of the receptacle and being provided on the interior thereof with a conical valve seat, an inner rotatable valve part tapered to fit the said seat, yieldable means for holding the inner valve part within the said seat, the valve parts being provided with openings therethrough registering in alignment at an angle to the longitudinal axis of the valve when the valve is open, the upper end of the opening through the outer valve part adapted to lie flush with the bottom of the receptacle and the lower end of the opening through the outer valve part adapted to extend below the bottom of the said receptacle.

5. In a drain valve for a receptacle, an outer valve part adapted to be secured in the bottom of the receptacle and to extend upwardly thereinto, the said outer valve part being provided with a conical seat extending therethrough larger in diameter at the upper end than at the lower end and being also provided with a pair of apertures extending through the wall thereof at an angle to the longitudinal axis thereof on opposite sides of the said seat, one of the said apertures adapted to lie flush with the bottom of the receptacle and the other of the said apertures adapted to lie below the bottom of the receptacle, an inner rotatable valve part tapered to fit the conical seat in the outer valve part and provided with a channel extending therethrough at an angle to the longitudinal axis thereof, a spring at the lower end of the valve holding the inner valve part in the seat therefor, the said channel of the inner valve part registering with the apertures in the outer valve part when the valve is open, a handle whereby the inner part may be rotated, and yieldable means for holding the valve in the open or closed position.

In testimony whereof, I sign this specification.

FRANK W. KIDDER.